June 24, 1941.　　H. F. PITCAIRN　　2,247,034
AIRCRAFT SUSTAINING ROTOR
Filed Dec. 22, 1938　　3 Sheets-Sheet 1
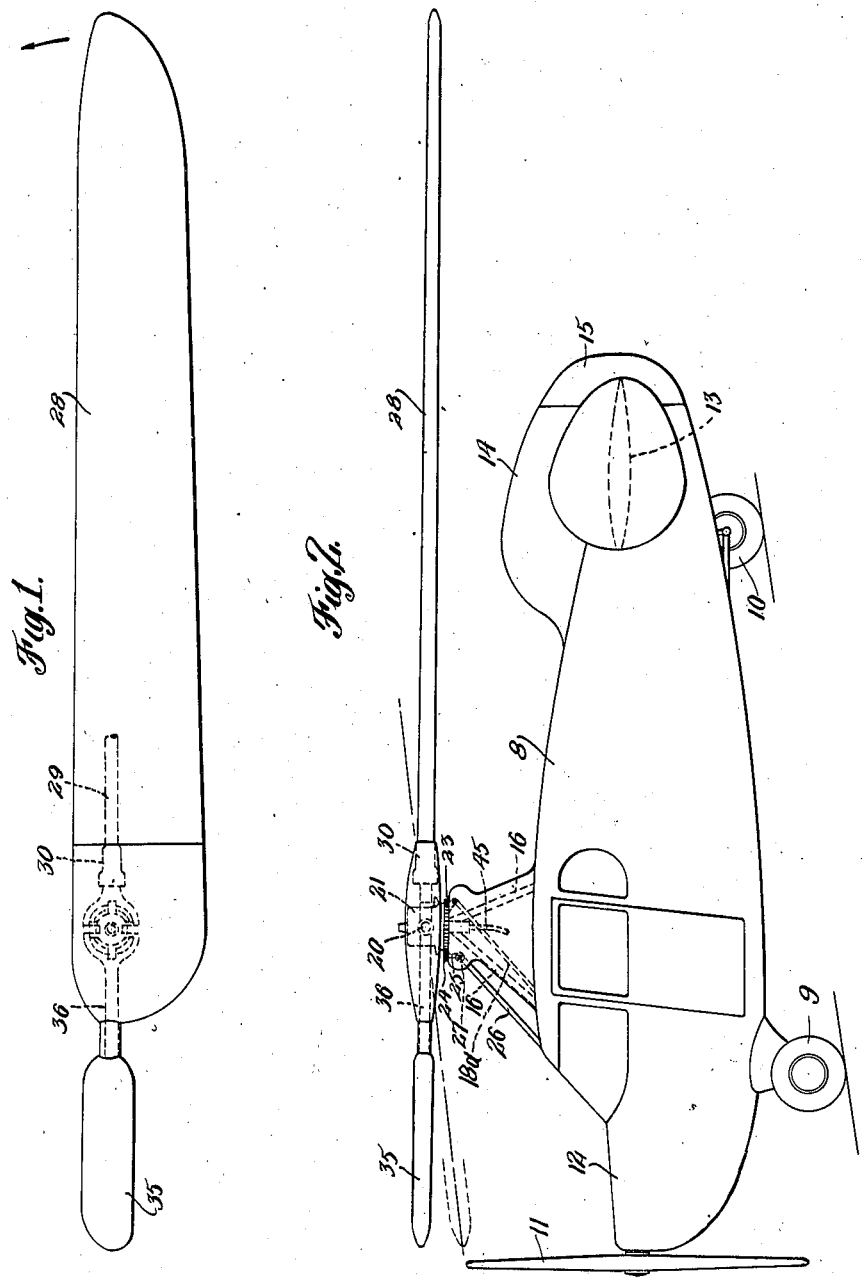
INVENTOR.
Harold F. Pitcairn
BY
Synnestvedt & Lechner
ATTORNEYS.

June 24, 1941.  H. F. PITCAIRN  2,247,034
AIRCRAFT SUSTAINING ROTOR
Filed Dec. 22, 1938  3 Sheets-Sheet 2

INVENTOR.
Harold F. Pitcairn
BY
Synnestvedt & Lechner
ATTORNEYS.

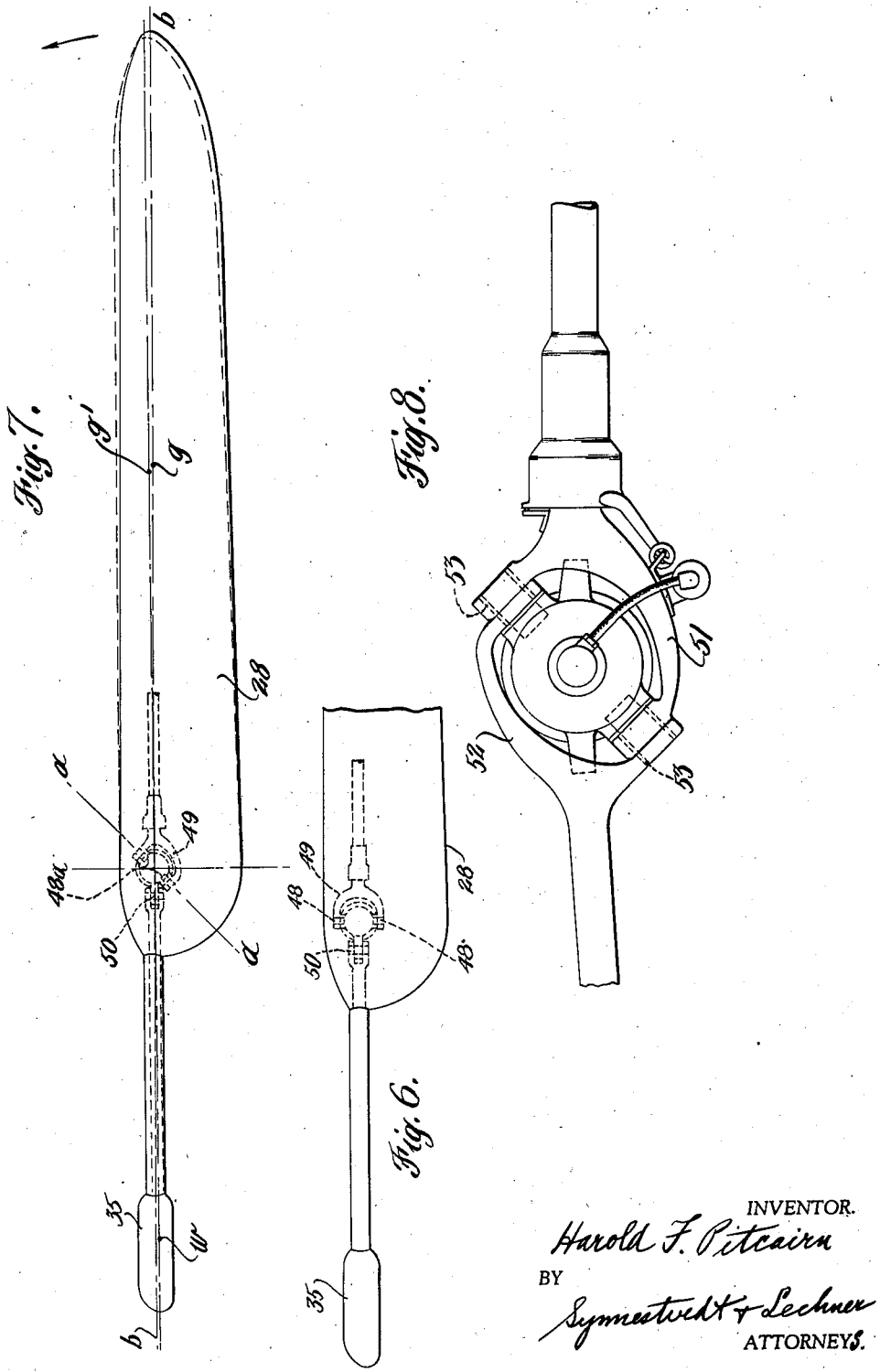

Patented June 24, 1941

2,247,034

UNITED STATES PATENT OFFICE 2,247,034

AIRCRAFT SUSTAINING ROTOR

Harold F. Pitcairn, Bryn Athyn, Pa., assignor to Autogiro Company of America, Willow Grove, Pa., a corporation of Delaware Application December 22, 1938, Serial No. 247,189

8 Claims. (Cl. 244—18)

This invention relates to aircraft sustaining rotors and is especially adapted for use in rotors of this general type which are capable of autorotative actuation in flight, and which are adapted to effect "direct" or substantially vertical take-off, particularly by that method which provides for drive of the rotor prior to take-off to a high rate with the blade or wing means at low lift low drag incidence, the incidence being increased and the drive disconnected at the moment of take-off so as to utilize kinetic energy stored in the rotor to produce a high thrust. In this type of mechanism the pitch may again be reduced to a value suitable for normal autorotative flight.

Furthermore, the invention is of particular utility in an aircraft sustaining rotor in which means are provided for shifting the lift line of the rotor for maneuvering purposes, especially where such means comprise one or more tilting fulcrums for the rotor hub.

It should be understood, however, that at least many features of the invention are also of utility and advantage in various types of aircraft other than those specifically mentioned, for instance in the helicopter type of machine.

One of the important objects of the invention is to eliminate or at least materialy reduce vibrations and/or periodic fluctuations in the direction and magnitude of the rotor lift as transmitted to the body of the machine, and also to eliminate or at least materially reduce the transmission of such vibrations or fluctuations to the control mechanism for shifting the lift line of the rotor, where such is employed.

Another important object of the invention lies in the simplification of various parts of the rotor, and especially of the hub, blade and blade mounting mechanism, this simplification being particularly important in a machine capable of direct take-off as above mentioned, in which provision is made for change of the blade pitch.

To the above ends, the invention contemplates the employment of only a single blade in the rotor and the provision of a counterweight for counterbalancing the single blade, and also the provision of novel pivot means for the blade and counterweight.

More specifically, the blade and counterweight are pivotally connected with the hub in a special manner which serves to reduce vibrations and lift fluctuations. Still further, the tilting fulcrums for the hub, provided for control purposes, are located in a special relation to the pivot or pivots for the blade and counterweight so as to provide freedom from vibrations and the like in the control system.

Other objects and advantages will appear as this description proceeds.

In the accompanying drawings—

Figure 1 is a top plan view of a rotor constructed in accordance with this invention;

Figure 2 is a side elevational view thereof as applied to an aircraft;

Figure 6 is a fragmentary top view similar to Figure 1, showing a modification thereof;

Figure 7 is a top plan view similar to the showing of Figure 6 but illustrating a modified construction; and Figure 8 is a top view similar to Figure 3 illustrating still another modified arrangement.

Figure 3:
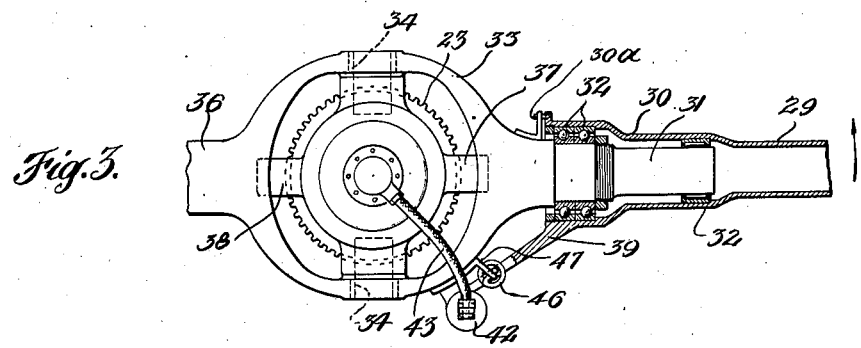
Figure 3 is an enlarged top plan view of portions of the rotor hub, with some of the associated parts shown in horizontal section.

Referring first to Figures 1 and 2, the body of the craft appears at 8 and is shown as provided with landing wheels 9, 10, forward propulsion air screw 11 driven by an engine located within the nose 12. Horizontal and vertical surfaces 13 and 14, together with a rudder 15, may also be employed at the tail.

The rotor is mounted above the body by means of pylon elements 16 (see Figure 5) which, at their upper ends, support a pylon apex member 17 on which the non-rotative hub part 18 is pivotally mounted by tilting trunnions 19 and 20 extended, respectively, longitudinally and transversely of the craft and, in effect, constituting a universal joint on which the entire hub may be tilted in any direction for control purposes in the general manner more fully described in copending application of Juan de la Cierva, Serial No. 645,985, filed December 6, 1932. One of the control connections for effecting tilting of the hub appears at 18a.

The rotative hub 21 is carried on the member 18 by suitable bearings 22, and this hub may be driven by means of ring gear 23 meshing with pinion 24 mounted on shaft 25 which, in turn, may be driven by the shafting 26 through universal joint 27. Shaft 26 (see Figure 2) extends forwardly and downwardly for connection with the engine of the craft, preferably through a disconnectible clutch as is now customary in this type of rotor drive mechanism.

The single blade of the rotor shown at 28 in

Figures 1 and 2 is desirably built up on a main longitudinal spar 29 having at its inner end a fitting or enlargement 30 (see Figure 3) adapted to be journalled on the spindle 31 by means of bearings 32. The blade is thereby mounted with freedom for pitch change movement substantially about its own longitudinal axis.

The spindle 31 projects from yoke 33 which embraces the hub and which is pivotally connected with the hub by means of aligned pivot devices 34—34 constituting a "flapping" pivot axis on which the blade is free to move in a direction generally transverse its mean rotative path of travel.

Returning to Figures 1 and 2, the counterweight 35 for the blade is connected with the yoke as by means of the spar-like element 36 in a position diametrically opposite to the blade.

Figure 5:
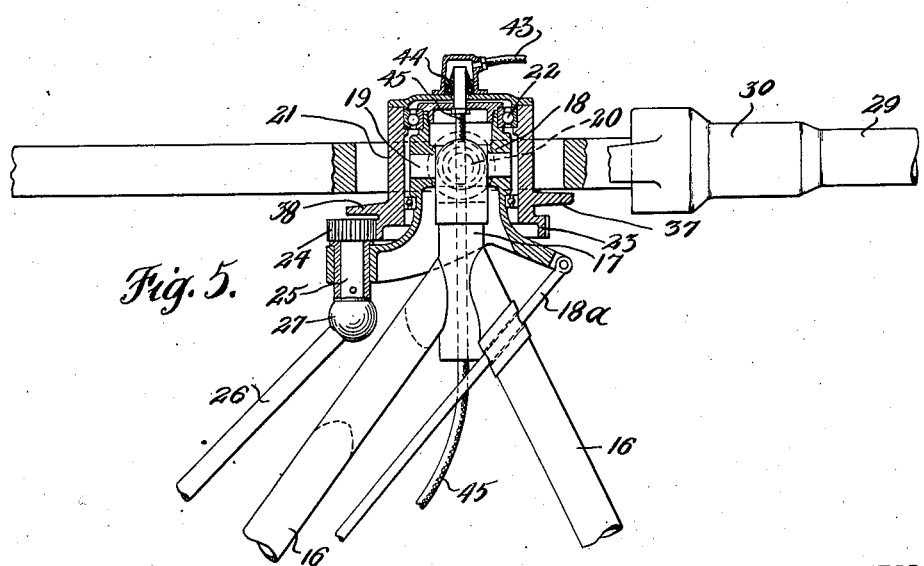
Figure 5 is a vertical section of the rotor hub, showing some adjacent parts, including the mounting pylon, in side elevation.

As seen in Figures 2 and 5, suitable devices 37 and 38 project from the rotative hub 21 and serve to limit downward movement of the blade or counterweight. Since the blade and counterweight are rigidly connected with each other, and since the average position of the blade in normal flight is somewhat upwardly coned, the average path of rotation of the weight lies below that of the blade. In view of this, the stop 38 for the weight should be disposed fairly well downwardly and may desirably be positioned somewhat lower than the stop 37 for the blade, as is shown in Figures 2 and 5.

In the arrangement of these figures, moreover, the path of movement of the extreme tip of the weight 35 lies behind the plane of the air screw 11, in view of which the rotor as a whole may be lowered somewhat, it being necessary only to dispose the droop stop 37 for the rotor blade at a horizontal level such that the rotor blade will clear the tips of the air screw blades.

Figure 4:
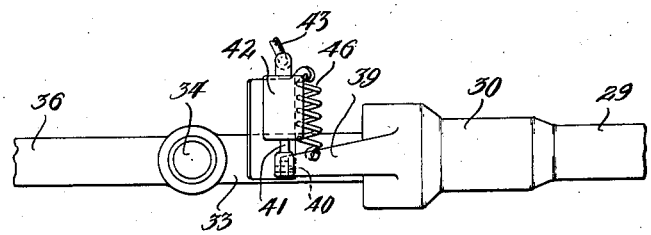
Figure 4 is a side elevational view of portions of the mechanism shown in Figure 3.

For the purpose of controlling the position of the blade about the pitch change pivot 30—31 (see particularly Figures 3 and 4), an arm 39 projects laterally and inwardly from the housing 30 and is connected at its free end by a pivot 40 with a piston rod 41 extended out of the lower end of piston and cylinder device 42. Fluid pressure may be admitted to and exhausted from the cylinder by means of the connection 43 which extends radially inwardly to the center of the hub at the top, at which point (see Figure 5) a rotative but fluid-tight connection 44 is provided so as to place the tube 43 into communication with pipe 45 which extends downwardly through the center of the hub and thence into the body of the machine for control by any desired valve mechanism.

Examination of the several figures of the drawings will show that admission of fluid into cylinder 42 will cause the piston stem 41 to be moved downwardly, and this in turn, acting through the lever 39, will cause the pitch of the blade to increase. This upper pitch value may be substantially higher than that utilized for normal translational flight, in order to provide high initial thrust for direct take-off.

Upon exhaust of fluid from cylinder 42, a return spring 46 reacting between lever 39 and a bracket 47 which is mounted on yoke 33, will cause the blade to return to a lower pitch position such, for instance, as is suitable for autorotative flight operation of the blade. A stop device 30a (Figure 3) may be employed to restrict pitch change movement of the blade to the desired limits.

In connection with the foregoing mechanism it is pointed out that several of the pivot relationships are of importance in accomplishing the objects and advantages hereinabove set out. Note that the flapping pivot 34—34 for the blade and counterweight is located so as to intersect the rotational axis of the hub, as is also the axis of the pitch change pivot 30—31, and further that the tilting trunnions 19 and 20 are so located with reference to the blade pivots that the axes of all of them intersect each other at a common point on the hub axis. This, of course, also involves location of the tilting trunnions 19 and 20 in the plane of attachment of the blade and counterweight to the hub, and this is of importance in reducing transmission of vibrations or reciprocatory effects of lift fluctuations to and through the control system provided for tilting the hub.

The arrangement of Figures 1 to 5 inclusive is also of advantage since the rigid connection of the blade and counterweight and the mounting of this rigid unit on the hub by means of a common pivot providing for flapping of the blade, relieves the flapping pivot parts of the centrifugal loads of the blade and weight which would be imposed thereon were the blade and weight separately pivoted to the hub.

However, in its broader aspects, the invention is not limited to the mounting of a rigid blade and counterweight unit by means of a single pivot. Certain other advantages are secured by employing separate pivots, as mentioned herebelow in connection with the arrangements of Figures 6, 7 and 8.

In Figure 6, the blade 28 and the counterweight 35 are provided with independent pivots connecting them with the hub, so as to provide independence of movement transverse the plane of rotation. Thus the blade is here mounted on the hub by means of pivot devices 48—48 which cooperate with the fork 49 and form a flapping pivot axis perpendicular to the longitudinal axis of the blade and intersecting the hub axis. The counterweight 35 is provided with a pivotal mounting 50 also positioned substantially perpendicular to the longitudinal blade axis, the pivots for both the blade and the weight lying substantially in a plane perpendicular to the rotor axis.

In considering the arrangement of Figure 6, attention is also called to the fact that in contrast to the arrangement of Figures 1 to 5, the counterweight 35 is located at a considerable distance from the axis of the hub. The arrangement of the first form as already noted has the advantage that the path of movement of the counterweight is at all times rearwardly disposed from the plane of the air screw 11, as clearly appears in Figure 2, thus enabling mounting of the rotor relatively low. In Figure 6, however, while clearance for the counterweight would be required above the upper part of the path of movement of the air screw 11, at the same time the counterweight, being disposed at a greater distance from the axis of the hub, is not required to be as heavy as in the first arrangement.

The type of pivotal mounting for the blade and counterweight of Figure 6 is especially suitable to the type of construction in which a relatively small weight is disposed at a relatively great distance from the axis of the hub.

In many respects the arrangement of Figure 7 is similar to that of Figure 6, but here the flapping pivot devices 48a for the blade mounting fork 49 are positioned to provide a flapping axis *a—a* obliquely inclined with respect to the longitudinal axis of the blade b—b when in true radial position, the included angle at the leading side of the blade axis being acute when viewed in plan as in Figure 6. The pivot 50 for the counterweight 35 is shown as in Figure 6.

Because of the obliquity of the blade flapping axis a—a, when the blade rises to its average coned position of normal flight, the center of gravity g of the blade is moved forwardly, when viewed in plan, to the position g'. With this in mind, in order to obtain counterbalancing action disposed as accurately as possible diametrically opposite to the center of gravity of the blade, the center of gravity w of the counterweight 35 is offset forwardly (with respect to the direction of rotation of the rotor) to the projection of a line passing through the forward position g' of the center of gravity of the blade and the axis of the hub.

In the further modification of Figure 8, the blade mounting fork 51 and the counterweight mounting fork 52 are mounted on common pivot devices 53—53, forming an axis for movement of the blade and weight which not only intersects the hub axis, but which is also obliquely inclined with respect to the longitudinal axis of the blade in the same sense as described above in connection with Figure 7. This arrangement simplifies the structure since the pivot devices 53—53 are used for both the blade and the weight.

All three of the arrangements shown in Figures 6, 7 and 8 have the advantage of relieving bending loads in the blade spar and the element employed for mounting the weight, the reason for this being that the blade and weight have freedom for independent movement.

Also, since tilting of the rotor hub at least momentarily sets up forces tending to move the blade and weight with respect to the hub, and since this movement under many conditions is different as between the blade and the weight, the arrangements of Figures 6, 7 and 8 providing independent pivots for the blade and weight, afford maximum freedom for accommodation of these asymmetrical forces, thereby avoiding transmission thereof either to the body of the machine or to the control system.

While the pitch change mechanism is not shown in detail in all of the figures of the drawings, it will be understood that it is intended that this mechanism may be incorporated in all arrangements. Furthermore, the mechanism in question may take a variety of forms, depending upon the particular type of flight operation desired. For more complete disclosure of the general type of take-off operation known as "direct" take-off (the use of which is preferred in accordance with this invention) reference may be had to the copending application of Juan de la Cierva, Serial No. 738,349, filed August 3, 1934, or to the copending application of James G. Ray, Serial No. 91,838, filed July 22, 1936, which latter application was issued October 1, 1940, as Patent No. 2,216,163.

In connection with all arrangements illustrated and described, it should be noted that the application of pitch change mechanism for various purposes, such as direct take-off, is unusually simple, there being only one blade to which the mechanism need be applied. In addition to reduction of structural parts, this has a number of other advantages compared to the multi-bladed type of rotor, since in the latter a problem arises in connection with assuring equal and simultaneous pitch change as to the several blades.

All arrangements described are further of advantage since the use of only a single blade eliminates the necessity for employing a "drag" hinge which, in multi-bladed rotors, has frequently been employed in addition to the flapping pivot and pitch change pivot. In effect, in the single bladed rotor, the rotor axis itself constitutes a drag pivot, for the reason that lag and lead forces on the blade may be accommodated by relative acceleration and deceleration of the blade in its rotative path. The absence of a separate drag hinge is also of advantage in simplifying application of the pitch control mechanism. Note that this mechanism in the forms shown is arranged for reaction between the blade mounting yoke or fork and the blade itself, and that no linkage or other flexible mechanism need be introduced to compensate for movements which would occur about a drag hinge.

Another advantageous feature of the arrangement shown is that a hub streamlining may be faired substantially directly into or with the blade, thus reducing parasite resistance and the like in the manner which will be clear from inspection of Figures 1, 2, 6 and 7.

What I claim is:

1. For an aircraft, a single blade sustaining rotor having a hub, a substantially non-lifting counterweight for the blade, controllable means for shifting the lift line of the rotor, and pivot means connecting the blade and counterweight with the hub and providing freedom for independent movement of the blade and weight generally transverse the path of rotation, the pivotal axis for the blade being positioned to substantially intersect the hub axis, and the pivotal axis for the counterweight being offset from the hub axis.

2. For an aircraft, a single blade sustaining rotor having a hub, a substantially non-lifting counterweight for the blade, controllable means for shifting the lift line of the rotor, and pivot means connecting the blade and counterweight with the hub and providing freedom for independent movement of the blade and weight generally transverse the path of rotation, the pivotal axis for the blade being extended at an oblique angle to the longitudinal blade axis and substantially intersecting the hub axis, and the pivotal axis for the counterweight being offset from the hub axis.

3. For an aircraft, a single blade sustaining rotor having a hub, a substantially non-lifting counterweight for the blade, controllable means for shifting the lift line of the rotor, and pivot means connecting the blade and counterweight with the hub and providing freedom for independent movement of the blade and weight generally transverse the path of rotation, the pivotal axes for the counterweight and blade being relatively angled when viewed in plan, with the pivotal axis for the blade obliquely inclined with respect to the longitudinal blade axis to form an acute angle at the leading side of the blade axis and with the axis for the weight positioned substantially perpendicular to the longitudinal axis of the blade.

4. For an aircraft, a single blade sustaining rotor having a hub, a substantially non-lifting counterweight for the blade, controllable means for shifting the lift line of the rotor, and pivot means connecting the blade and counterweight with the hub and providing freedom for independent movement of the blade and weight generally transverse the path of rotation, the pivotal axes for the counterweight and blade being relatively angled when viewed in plan, with the pivotal axis for the blade obliquely inclined with respect to the longitudinal blade axis to form an acute angle at the leading side of the blade axis and with the axis for the weight positioned substantially perpendicular to the longitudinal axis of the blade, the center of gravity of the counterweight being offset forwardly (with respect to the direction of rotation of the rotor) from the projection of a line passing through the hub axis and the center of gravity of the blade when the latter lies in a plane substantially perpendicular to the hub axis.

5. For an aircraft, a single blade sustaining rotor having a hub, a substantially non-lifting counterweight for the blade, pivot means connecting the counterweight and blade with the hub and providing freedom for independent movement thereof generally transverse the path of rotation, the pivotal axes for both the counterweight and the blade being obliquely inclined with respect to the longitudinal blade axis to form an acute angle at the leading side of the latter when viewed in plan, the center of gravity of the counterweight being offset forwardly (with respect to the direction of rotation of the rotor) from the projection of a line passing through the hub axis and the center of gravity of the blade when the latter lies in a plane substantially perpendicular to the hub axis.

6. For an aircraft, a single blade sustaining rotor having a hub, a substantially non-lifting counterweight for counterbalancing the blade, the counterweight and blade being pivotally connected to the hub with freedom for independent swinging movement about axes oblique to the longitudinal axis of the blade when viewed in plan, controllable means for shifting the lift line of the rotor for control purposes including a tilting fulcrum for mounting the hub, which tilting fulcrum lies substantially in the plane of connection of the blade and weight to the hub, and a pitch change pivot for the blade having its axis also lying substantially in said plane.

7. For an aircraft, a single blade sustaining rotor having a hub, a substantially non-lifting counterweight for counterbalancing the blade, the counterweight and blade being pivotally connected to the hub with freedom for independent swinging movement about axes oblique to the longitudinal axis of the blade when viewed in plan, controllable means for shifting the lift line of the rotor for control purposes including a tilting fulcrum for mounting the hub, which tilting fulcrum lies substantially in the plane of connection of the blade and weight to the hub, a pitch change pivot for the blade having its axis also lying substantially in said plane, and controllable means for varying the pitch of the blade on said pitch change pivot.

8. For an aircraft, a single blade sustaining rotor having a hub, a substantially non-lifting counterweight for the blade, controllable means for shifting the lift line of the rotor, and pivot means connecting the blade and counterweight with the hub and providing freedom for independent movement of the blade and weight generally transverse the path of rotation, the pivotal axis for the blade being obliquely inclined, when viewed in plan, with respect to the longitudinal blade axis to form an acute angle at the leading side of the blade axis, the center of gravity of the counterweight being offset forwardly (with respect to the direction of rotation of the rotor) from the projection of the line passing through the hub axis and the center of gravity of the blade when the latter lies in a plane substantially perpendicular to the hub axis.

HAROLD F. PITCAIRN.